US008351402B2

(12) United States Patent
Lim et al.

(10) Patent No.: US 8,351,402 B2
(45) Date of Patent: Jan. 8, 2013

(54) DIGITAL COMMUNICATION SYSTEM USING FREQUENCY SELECTIVE BASEBAND AND METHOD THEREOF

(75) Inventors: In-Gi Lim, Daejon (KR); Ki-Hyuk Park, Daejon (KR); Sung-Weon Kang, Daejon (KR); Kyung-Soo Kim, Daejon (KR); Jung-Bum Kim, Daejon (KR); Chang-Hee Hyoung, Daejon (KR); Hyung-Il Park, Daejon (KR); Duck-Gun Park, Daejon (KR); Jung-Hwan Hwang, Daejon (KR); Sung-Eun Kim, Seoul (KR); Jin-Kyung Kim, Daejon (KR); Jin-Bong Sung, Daejon (KR); Hyuk Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 645 days.

(21) Appl. No.: 12/517,065

(22) PCT Filed: Dec. 5, 2007

(86) PCT No.: PCT/KR2007/006282
§ 371 (c)(1),
(2), (4) Date: May 30, 2009

(87) PCT Pub. No.: WO2008/069571
PCT Pub. Date: Jun. 12, 2008

(65) Prior Publication Data
US 2010/0074257 A1    Mar. 25, 2010

(30) Foreign Application Priority Data

Dec. 7, 2006   (KR) ........................ 10-2006-0124028

(51) Int. Cl.
*H04B 7/216*    (2006.01)

(52) U.S. Cl. ........ 370/335; 370/342; 370/441; 375/130; 375/146

(58) Field of Classification Search .................. None
See application file for complete search history.

(56) References Cited

U.S. PATENT DOCUMENTS 5,442,662 A    8/1995   Fukasawa et al.
(Continued)

FOREIGN PATENT DOCUMENTS

EP    0851601 A2    7/1998
(Continued)

OTHER PUBLICATIONS

T.G. Zimmerman, "Personal Area Networks: Near-field intrabody communication," IBM System Journal, 1996, pp. 609-617, vol. 35, Nos. 3&4.

(Continued)

*Primary Examiner* — Michael J Moore, Jr.

(57) ABSTRACT

Provided are a digital communication system using frequency selective baseband and a method thereof. A transmitter of the digital communication system, includes: a preamble/header transmission processing unit for spreading a preamble for frame synchronization and a header including data information; a data transmission processing unit for spreading data by using spread codes having dominant frequency in a desired frequency band, i.e., frequency selective spread codes; and a multiplexer for multiplexing the spreaded preamble and the spreaded header from the preamble/header transmission processing unit and the frequency selective spreaded data from the data transmission processing unit and transmitting the multiplexed signal in digital.

13 Claims, 4 Drawing Sheets

U.S. PATENT DOCUMENTS

| | | | |
|---|---|---|---|
| 7,006,554 B2* | 2/2006 | Sun et al. | 375/130 |
| 7,190,683 B2* | 3/2007 | Giallorenzi et al. | 370/335 |
| 7,349,375 B2* | 3/2008 | Gerakoulis | 370/335 |
| 7,773,946 B2* | 8/2010 | Lee et al. | 455/45 |
| 7,961,061 B2* | 6/2011 | Lim et al. | 332/117 |
| 2001/0055294 A1* | 12/2001 | Motoyoshi | 370/342 |
| 2003/0026200 A1* | 2/2003 | Fu et al. | 370/208 |
| 2004/0066838 A1* | 4/2004 | Choi et al. | 375/146 |
| 2005/0157670 A1* | 7/2005 | Tang et al. | 370/320 |
| 2006/0252371 A1 | 11/2006 | Yanagida | |
| 2007/0258509 A1* | 11/2007 | Ito et al. | 375/141 |
| 2009/0304045 A1* | 12/2009 | Lei et al. | 375/140 |
| 2010/0272159 A1* | 10/2010 | Lim et al. | 375/146 |
| 2010/0329380 A1* | 12/2010 | Kang et al. | 375/285 |

FOREIGN PATENT DOCUMENTS

| | | |
|---|---|---|
| EP | 1416657 A1 | 5/2004 |
| JP | 09-008696 A | 1/1997 |
| JP | 2006-303736 A | 11/2006 |
| JP | 2006-325062 A | 11/2006 |
| JP | 4705184 B2 | 3/2011 |
| KR | 1020040004709 A | 1/2004 |
| KR | 10-0449546 | 9/2004 |
| KR | 1020060012755 A | 2/2006 |
| KR | 1020060064472 A | 6/2006 |
| KR | 100829865 B1 | 5/2008 |
| WO | WO 02/060073 A2 | 8/2002 |
| WO | WO 2004/070981 A1 | 8/2004 |

OTHER PUBLICATIONS

International Search Report for application PCT/KR2007/006282 filed Dec. 5, 2007.

Written Opinion of the International Search Authority for application PCT/KR2007/006282 filed Dec. 5, 2007.

Chihiro Fujita, "A Proposal of Sub-carrier Parallel Combinatorial Multi-carrier DS-CDMA System", The Institute of Electronics, Information and Communication Engineers, B-5-61, Mar. 7, 2000, pp. 446.

Hyung-Il Park et al., "Human Body Communication System with FSBT", 2010 IEEE 14th International Symposium on Consumer Electronics, Jun. 10, 2010.

Toshiyuki Maeyama et al., "The high-speed human body communication system", IEICE Technical Report, A•P2006-105, Dec. 7, 2006, pp. 53-58, vol. 106, No. 416, The Institute of Electronics, Information and Communication Engineers.

Jun-Ichi Kitagawa et al., "Wireless Baseband Transmission Experiments", IEICE Technical Report, A•P2004-12, May 13, 2004, pp. 1-6, vol. 104, No. 58, The Institute of Electronics, Information and Communication Engineers.

Qinghua Shi et al., "Simple spreading code allocation scheme for downlink MC-CDMA", Electronics Letters, Jul. 18, 2002, vol. 38, No. 15.

Ali Saidi, "Spectrum Shaping Using Weighted Code-Hopping CDMA", 2005 IEEE, Oct. 28, 2005, pp. 494-498.

Hassan El Ghazi et al., "Efficient Spreading Code Allocation Strategy for a Downlink MC-CDMA System in a Time Varying Frequency Selective Channel", The 17th Annual IEEE International Symposium on Personal, Indoor and Mobile Radio Communications (PIMRC'06), Sep. 1, 2006, pp. 1-5, IEEE.

Shigenobu Sasaki et al., "A Study on Error Control Techniques for Parallel Combinatory Spread Spectrum Communication System", The Institute of Electronics, Information and Communication Engineers, Mar. 1993, pp. 519-527, vol. J76-A No. 3.

Hideyuki Matsutani et al., "Multi-Carrier DS-CDMA Using Frequency Spreading Coding", IEICE Transactions on Fundamentals, Dec. 25, 1999, pp. 2634-2642, vol. E82-A No. 12.

* cited by examiner

Fig. 3
Sub-group 0 ($W_0 \sim W_{15}$)

| W0 | 0000000000000000000000000000000000000000000000000000000000000000 |
|---|---|
| W1 | 0000000000000000000000000000000011111111111111111111111111111111 |
| W2 | 0000000000000000111111111111111111111111111111110000000000000000 |
| W3 | 0000000000000000111111111111111100000000000000001111111111111111 |
| W4 | 0000000011111111111111110000000000000000111111111111111100000000 |
| W5 | 0000000011111111111111110000000011111111000000000000000011111111 |
| W6 | 0000000011111111000000001111111111111111000000001111111100000000 |
| W7 | 0000000011111111000000001111111100000000111111110000000011111111 |
| W8 | 0000111111110000000011111111000000001111111100000000111111110000 |
| W9 | 0000111111110000000011111111000011110000000011111111000000001111 |
| W10 | 0000111111110000111100000000111111110000000011110000111111110000 |
| W11 | 0000111111110000111100000000111100001111111100001111000000001111 |
| W12 | 0000111100001111111100001111000000001111000011111111000011110000 |
| W13 | 0000111100001111111100001111000011110000111100000000111100001111 |
| W14 | 0000111100001111000011110000111111110000111100001111000011110000 |
| W15 | 0000111100001111000011110000111100001111000011110000111100001111 |

Fig. 4
Sub-group 1 ($W_{16} \sim W_{31}$)

| W16 | 0011110000111100001111000011110000111100001111000011110000111100 |
|---|---|
| W17 | 0011110000111100001111000011110011000011110000111100001111000011 |
| W18 | 0011110000111100110000111100001111000011110000110011110000111100 |
| W19 | 0011110000111100110000111100001100111100001111001100001111000011 |
| W20 | 0011110011000011110000110011110000111100110000111100001100111100 |
| W21 | 0011110011000011110000110011110011000011001111000011110011000011 |
| W22 | 0011110011000011001111000011110000110011110011000011001111001100 |
| W23 | 0011110011000011001111000011001111001100001100111100111100110011 |
| W24 | 0011001111001100001100111100110000110011110011000011001111001100 |
| W25 | 0011001111001100001100111100110011001100001100111100110000110011 |
| W26 | 0011001111001100110011000011001111001100001100110011001111001100 |
| W27 | 0011001111001100110011000011001100110011110011001100110000110011 |
| W28 | 0011001100110011110011001100110000110011001100111100110011001100 |
| W29 | 0011001100110011110011001100110011001100110011000011001100110011 |
| W30 | 0011001100110011001100110011001111001100110011001100110011001100 |
| W31 | 0011001100110011001100110011001100110011001100110011001100110011 |

Fig. 5
Sub-group 2 ($W_{32} \sim W_{47}$)

| W32 | 0110011001100110011001100110011001100110011001100110011001100110 |
|---|---|
| W33 | 0110011001100110011001100110011010011001100110011001100110011001 |
| W34 | 0110011001100110100110011001100110011001100110010110011001100110 |
| W35 | 0110011001100110100110011001100110010110011001101001100110011001 |
| W36 | 0110011010011001100110010110011001100110100110011001100101100110 |
| W37 | 0110011010011001100110010110011010011001101001100110011010011001 |
| W38 | 0110011010011001011001101001100110011001101001101001100101100110 |
| W39 | 0110011010011001011001101001100101100110100110010110011010011001 |
| W40 | 0110100110010110100110011001011001101001100101100110100110010110 |
| W41 | 0110100110010110100110011001011010100110100110010110100110011001 |
| W42 | 0110100110010110100101101001101001100110100110010110100110010110 |
| W43 | 0110100110010110100101101001101001011010011010010110100110011001 |
| W44 | 0110100101101001100101101001011010011010010110100110010110010110 |
| W45 | 0110100101101001100101101001011010100101101001011001101001101001 |
| W46 | 0110100101101001011010010110100110010110100101101001011010010110 |
| W47 | 0110100101101001011010010110100101101001011010010110100101101001 |

Sub-group 3 ($W_{48} \sim W_{63}$)

| W48 | 0101101001011010010110100101101001011010010110100101101001011010 |
|---|---|
| W49 | 0101101001011010010110100101101010010110100101101001011010100101 |
| W50 | 0101101001011010101001011010010110100101101001010101101001011010 |
| W51 | 0101101001011010101001011010010101011010010110101010010110100101 |
| W52 | 0101101010100101101001010101101001011010101001011010010101011010 |
| W53 | 0101101010100101101001010101101010100101010110100101101010100101 |
| W54 | 0101101010100101010110101010010110100101010110101010010101011010 |
| W55 | 0101101010100101010110101010010101011010101010010101101010100101 |
| W56 | 0101010110101010010101011010101001010101101010100101010110101010 |
| W57 | 0101010110101010010101011010101010101001010101101010100101010101 |
| W58 | 0101010110101010101010100101010110101010010101010101011010101010 |
| W59 | 0101010110101010101010100101010101010110101010101010101001010101 |
| W60 | 0101010101010110101010101010100101010101010101011010101010101010 |
| W61 | 0101010101010110101010101010101010101010101010100101010101010101 |
| W62 | 0101010101010101010101010101011010101010101010101010101010101010 |
| W63 | 0101010101010101010101010101010101010101010101010101010101010101 |

DIGITAL COMMUNICATION SYSTEM USING FREQUENCY SELECTIVE BASEBAND AND METHOD THEREOF

TECHNICAL FIELD

The present invention relates to a digital communication system using frequency selective baseband and a method thereof; and, more particularly, to a digital communication system using frequency selective baseband which can acquire a predetermined processing gain, decrease a complexity of analog transmission/reception blocks and reduce power consumption by selecting some spread codes having dominant frequency in user's desired frequency band and a method thereof.

This work was supported by the Information Technology (IT) research and development program of the Korean Ministry of Information and Communication (MIC) and the Korean Institute for Information Technology Advancement (IITA) [2006-S-072-01, "Controller SoC for Human Body Communications"].

BACKGROUND ART

In Korean patent application No. 10-2006-0113329, filed on Nov. 16, 2006 by the same applicant of the present invention, i.e., Electronics and Telecommunications Research Institution (ETRI), "a human body communication system by using limited passband and a method thereof" is suggested. In the above patent application, limited passband, i.e., from 5 MHz to 40 MHz, is used to implement the human body communication system, and a scrambling based on a unique user identification (ID), a channel coding, an interleaving and a spreading operate in order to perform a low-power and a stable human body communication.

However, the above patent application uses the passband having an intermediate frequency (fc), which is used in most of communication systems. Consequently, an analog transceiver including a digital-to-analog converter, an analog-to-digital converter and an intermediate frequency converter is needed. An aspect of low-power, the above converters are considered undesirably. Moreover, in the above patent application, a time domain/frequency domain spreading method is applied to obtain a processing gain, but the spreading method is not efficient for increasing data transmission rate and performing transmission/reception data stably due to the limited frequency band.

DISCLOSURE OF INVENTION

Technical Problem

An embodiment of the present invention is directed to provide a digital communication system, particularly a human body communication system, using frequency selective baseband which can acquire a predetermined processing gain, decrease a complexity of analog transmission/reception blocks and reduce power consumption by selecting some spread codes having dominant frequency in user's desired frequency band and a method thereof.

In other words, the embodiment of the present invention is directed to provide the digital communication system using the frequency selective baseband which can select spread codes having dominant frequency, e.g., 16 spread codes, in user s desired frequency band among total frequency bands occupied by total spread codes, e.g., 64 Walsh Codes, and the method thereof.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a transmitter of the digital communication system, including: a preamble/header transmission processing unit for spreading a preamble for frame synchronization and a header including data information; a data transmission processing unit for spreading data by using spread codes having dominant frequency in a desired frequency band, i.e., frequency selective spread codes; and a multiplexer for multiplexing the spreaded preamble and the spreaded header from the preamble/header transmission processing unit and the frequency selective spreaded data from the data transmission processing unit and transmitting the multiplexed signal in digital.

In the above transmitter, the preamble/header transmission processing unit includes a header check sequence (HCS) generator for generating a header check sequence (HCS).

In accordance with another aspect of the present invention, there is provided a receiver of a digital communication system, including: a demultiplexer for demultiplexing a digital signal transmitted from an outside into a preamble, a header and data; a header reception processing unit for recovering data information by despreading the header; and a data reception processing unit for despreading the data based on frequency selective spread codes, which is used in a transmitter.

In the above receiver, the header reception processing unit includes a header check sequence (HCS) verifier for performing an error check to the despreaded header based on a header check sequence (HCS).

In accordance with another aspect of the present invention, there is provided a method for transmitting signals in a digital communication system, including: generating a preamble for frame synchronization; receiving data and data information from a MAC processor; spreading the preamble and the data information; converting the data into parallel data; frequency selective spreading the parallel data by using spread codes having dominant frequency in a desired frequency band, i.e., frequency selective spread codes; multiplexing the spreaded preamble, the spreaded data information and the frequency selective spreaded data to a digital signal; and transmitting the digital signal.

In accordance with another aspect of the present invention, there is provided a method for receiving signals in a digital communication system, including: demultiplexing a digital signal from an outside into a preamble, a header and data; recovering data information by despreading the header; frequency selective despreading the data by using frequency selective spread codes, which are used in a transmitter; and transmitting the frequency selective despreaded data to a MAC processor.

In accordance with the present invention, the digital communication system is a human body communication system which uses a human body as a communication channel.

In the digital communication system, particularly the human body communication of the present invention, a frequency band can be selected by a user among the total frequency bands occupied by the total spread codes. Also, the preset invention is a data transmission method which uses a data serial-to-parallel converting and a frequency selective spread codes in order to transmit and receive data stably with low-power between communication devices, which use a human body as a communication channel, connected to the human body in the human body communication system.

In addition, the present invention is a communication method which uses the human body as a medium of communication. In the present invention, a region from DC to 5 MHz having large interferences from outside devices is excluded, and a region from 5 MHz to 40 MHz having larger transmission power than radiation power of the human body is used. Consequently, the human body communication can be performed having low energy consumption for data transmission and strong tolerance of outside noise.

Advantageous Effects

The present invention uses a human body as a communication channel, and thus interferences between users can be reduced based on characteristics of the human body channel when data are transmitted and received between communication devices connected to the human body. Also, when strong interference is induced from other electronic devices, communication through the human body can be provided stably with low-power.

Also, the present invention can decrease complexity of analog transmission/reception blocks and improve power consumption of the total system by applying a data serial-to-parallel converting and a frequency selective band transmitting method using frequency selective spread code in the human body communication system, which uses the limited frequency band for decreasing the interferences between the users and the strong interference induced from other electronic devices.

In addition, the present invention can get higher processing gain of the total system by using spread code having a large spreading ratio due to a frequency gain acquired by the data serial-to-parallel converting.

Moreover, the present invention can transmit large amount of data as much as a serial-to-parallel conversion ratio than a spreading method, which multiplies the data by the spread code, by using a modulation method which uses output data of the serial-to-parallel converter as spread code selection.

BRIEF DESCRIPTION OF THE DRAWINGS

FIGS. 3 to 6 are sub-groups of 64-bit Walsh code in accordance with the present invention.

FIG. 7 is a detailed block diagram illustrating a frequency selective spreader of FIG. 2 in accordance with an embodiment of the present invention.

BEST MODE FOR CARRYING OUT THE INVENTION

The advantages, features and aspects of the invention will become apparent from the following description of the embodiments with reference to the accompanying drawings, which is set forth hereinafter, and thus the invention will be easily carried out by those skilled in the art to which the invention pertains. Also, when it is considered that detailed description on a related art may obscure the points of the present invention unnecessarily in describing the present invention, the description will not be provided herein. Hereinafter, specific embodiments of the present invention will be described with reference to the accompanying drawings.

The present invention can be applied to a digital communication system, particularly, a human body communication system. Hereinafter, the human body communication system will be described for the sake of convenience.

Figure 1:
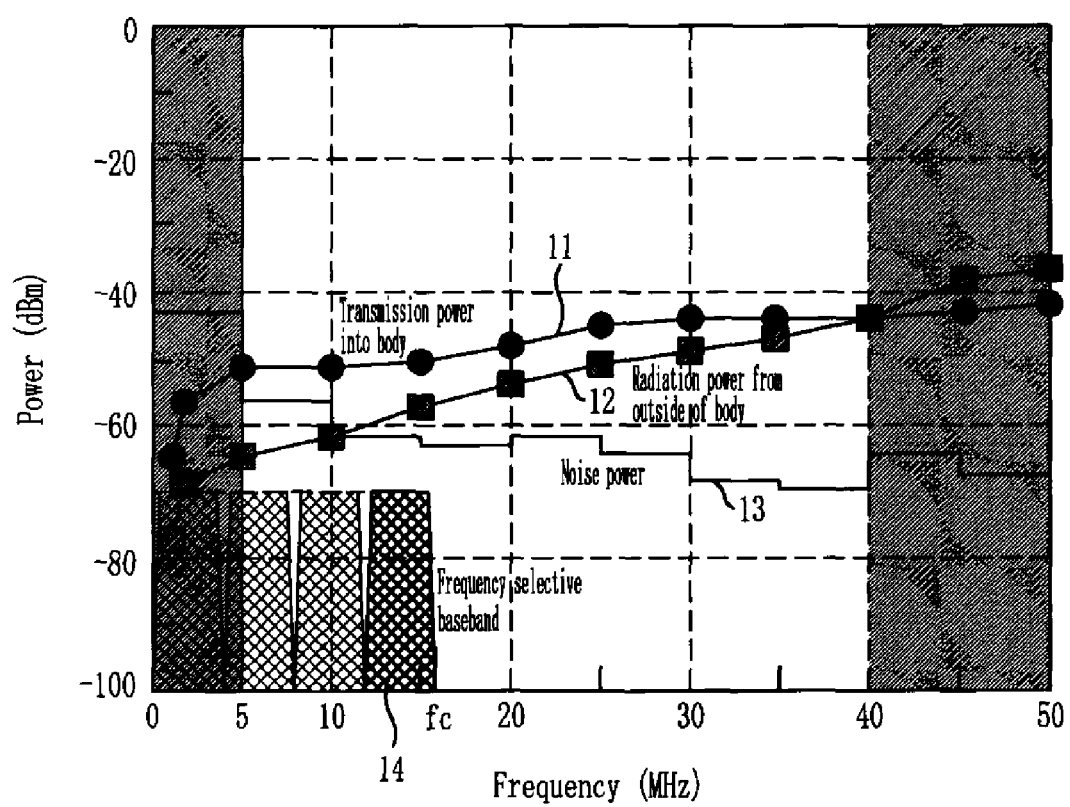
FIG. 1 is a diagram illustrating a frequency selective baseband for a human body communication, and transmission power into a body, radiation power from outside of the body and noise power of near the body for each frequency in accordance with the present invention.

FIG. 1 is a diagram illustrating a frequency selective baseband for a human body communication, and transmission power into a body, radiation power from outside of the body and noise power of near the body for each frequency in accordance with the present invention.

As shown in FIG. 1, there are frequency bands used for the human body communication system. In 0 Hz (DC) to 40 MHz, transmission power 11 of signals transmitted into the body, i.e., power of transmitted signal through a body as a waveguide, is a dominant power than radiation power 12 from outside of the body, i.e., power of radiated signal from the body which is used as an antenna. In more than 40 MHz, the radiation power 12 from outside of the body is larger than the transmission power 11 into the body.

Also, all kinds of electromagnetic waves originated by various appliances, e.g., vehicle, fluorescent lamp, mobile phone, computer, TV, radio, around the body, induce signals into the body, thus induction signals into the body act as interference signals in the human body communication.

Interference signals induced into the body are measured in various measurement places and measurement results are acquired. Noise power 13 shown in FIG. 1 is acquired by adding the measurement results and averaging the added values for every 5 MHz. As shown in FIG. 1, the noise power 13 has a large value in a frequency band from DC to 5 MHz.

In a conventional Korean application No. 10-2006-0113329, a frequency band from 5 MHz to 40 MHz is used for a passband except a region having maximum noise power, i.e., from DC to 5 MHz and a region over 40 MHz that is a frequency corresponding to a cross point of 11 and 12 in FIG. 1. In over 40 MHz, the radiation power 12 is larger than the transmission power 11. However, in order to use the limited frequency band from 5 MHz to 40 MHz as the passband, an up-conversion step for up-converting a baseband used in the conventional communications to the passband is needed.

The present invention does not use the passband suggested in the above Korean application to transmit and receive data by using the limited frequency band from 5 MHz to 40 MHz except the region from DC to 5 MHz and the region over 40 MHz, but the present invention uses a frequency selective baseband.

The frequency selective baseband uses spread codes having dominant frequency characteristics in user's desired frequency band, with respect to all spread codes used for the data processing gain. Consequently, the frequency selective baseband can perform baseband transmission with a simple analog transceiver, i.e., analog processing unit, and acquire both desired frequency band and processing gain.

A frequency selective baseband method of the present invention uses 64 Walsh Codes. Herein, 64 Walsh Codes are generated by dividing frequency band from 0 to 16 MHz into 64 frequency bands, and dominant frequencies are distributed successively. Here, 64 Walsh Codes are divided into 4 sub-groups, and a Walsh Code sub-group having maximum frequency band 14 is selected. Thus, the frequency selective baseband transmission using desired frequency band can be performed.

Figure 2:
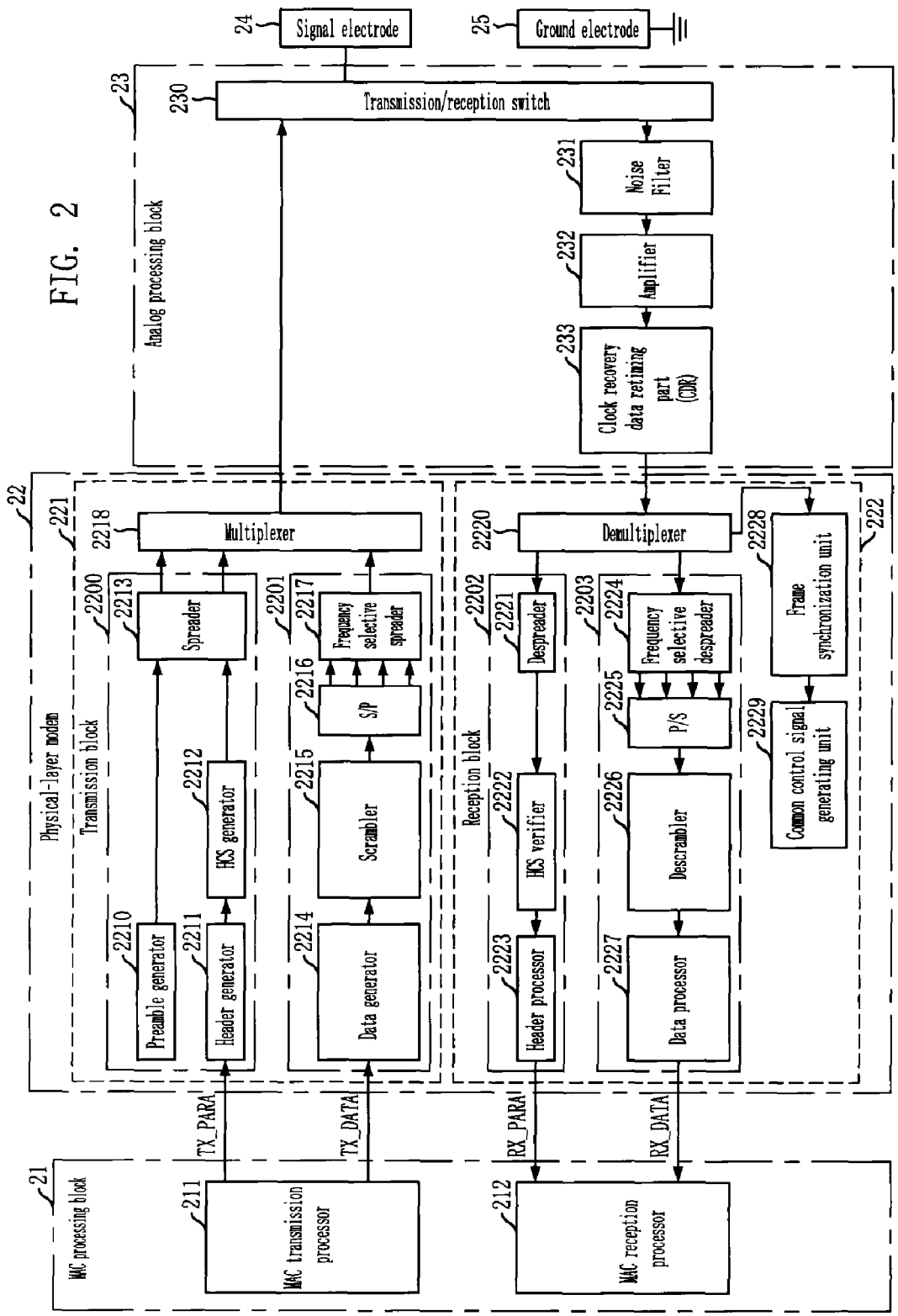
FIG. 2 is a block diagram illustrating a human body communication system using a frequency selective baseband in accordance with an embodiment of the present invention.

FIG. 2 is a block diagram illustrating a human body communication system using a frequency selective baseband in accordance with an embodiment of the present invention.

Hereinafter, a human body communication method through the human body communication system, i.e., data transmission and reception method, applied to the human body communication system will be described together with description of FIG. 2.

The human body communication system in accordance with the present invention includes a MAC processing block 21, a physical-layer modem 22, an analog processing block 23, a signal electrode 24 and a ground electrode 25. Herein, the physical-layer modem 22 uses a frequency selective baseband transmission method.

The MAC processing block 21 of the human body communication includes a MAC transmission processor 211 and a MAC reception processor 212. Herein, the MAC transmission processor 211 processes data to be transmitted and data information, e.g., a transmission rate, a modulation method, a user ID, a data length, received from an upper layer and transmits them to a transmission block 221 in the physical-layer modem 22, and the MAC reception processor 212 processes data and data information received from a reception block 222 in the physical-layer modem 22 and transmits them to the upper layer.

Hereinafter, a transmitter of the human body communication system will be described. The transmitter includes the MAC transmission processor 211 and the transmission block 221 in the physical-layer modem 22 of the human body communication. The transmission block 221 in the physical-layer modem 22 includes a preamble generator 2210, a header generator 2211, a header check sequence (HCS) generator 2212, a spreader 2213, a data generator 2214, a scrambler 2215, a serial-to-parallel (S/P) converter 2216, a frequency selective spreader 2217, and a multiplexer 2218. The transmission block 221 uses the frequency selective spread codes by applying a frequency selective baseband transmission technology, so that the predetermined processing gain can be acquired, and user can select spread codes corresponding to a desired frequency band.

The transmission block 221 in the physical-layer modem 22 includes a preamble/header transmission processing unit 2200, a data transmission procession unit 2201, and a multiplexer 2218.

Herein, the preamble/header transmission processing unit 2200 spreads a preamble for frame synchronization and a header and includes the preamble generator 2210, the header generator 2211, the HCS generator 2212 and the spreader 2213.

The data transmission processing unit 2201 spreads data by using spread codes having dominant frequency characteristics among user's desired frequency band, i.e., frequency selective spread codes, includes the data generator 2214, the scrambler 2215, the serial-to-parallel (S/P) converter 2216 and the frequency selective spreader 2217. The multiplexer 2218 outputs a digital signal by multiplexing the spreaded preamble and the spreaded header in the preamble/header transmission processing unit and the frequency selective spreaded data in the data transmission processing unit and transmits the digital signal.

Hereinafter, elements of the transmission block 221 will be described in detail.

The preamble generator 2210 is initialized by a well-known initial value and generates a preamble having a predetermined length.

The header generator 2211 receives the data information, i.e., a transmission rate, a modulation method, a user ID, a data length, from the MAC transmission processor 211, forms and outputs the a header having an agreement header format.

The HCS generator 2212 receives the header from the header generator 2211 and generates a header check sequence (HCS).

The spreader 2213 spreads the preamble from the preamble generator 2110 and the HCS from the HCS generator 2212 based on a predetermined spread code, respectively. Particularly, the predetermined spread code is one of frequency selective spread codes used in the frequency selective spreader 2217, i.e., one of Walsh codes in sub-group 3 in FIG. 6.

The data generator 2214 receives the data to be transmitted, from the MAC transmission processor 211, and outputs the data at predetermined time. The scrambler 2215 is used to maintain a security between a host terminal and a specific terminal which needs security, generates an orthogonal code by using an initial value predetermined between the two terminals, and scrambles the data received from the data generator 2214 based on the generated orthogonal code. In other words, data scrambling is performed by an XOR operation between the orthogonal code and the data received from the data generator 2214.

The S/P converter 2216 receives the scrambled data and performs 4-bit serial-to-parallel conversion. The 4-bit serial-to-parallel conversion decreases frequency band used to data transmission into ¼. Consequently, large amount of data can be transmitted by using the same frequency band, or high-quality data can be transmitted by using large processing gain of the spread code within the same frequency band.

The frequency selective spreader 2217 receives a 4-bit output from the S/P converter 2216 in parallel, and spreads it by using the frequency selective spread codes. The frequency selective spreader 2217 will be described in detail referring to FIG. 7.

The multiplexer 2218 multiplexes the preamble, the header and the data based on a frame format and outputs the multiplexed frame.

As the frequency selective spreader 2217 is used, a baseband transmission using the desired frequency band becomes possible. Also, a digital direct transmission becomes possible based on 1-bit output. Therefore, the output signal of the multiplexer 2218 can be transmitted into the body through a transmission/reception switch 230 and the signal electrode 24 without separate analog transmission processing units, e.g., transmission filter, digital-to-analog converter and intermediate frequency converter. The ground electrode 25 provides a reference voltage such as a ground of the human body system.

In other words, the present invention does not use the analog transmission processing units, e.g., the transmission filter, the digital-to-analog converter and the intermediate frequency converter, by direct transmitting the selective frequency band based on the frequency selective spread code in digital.

Moreover, the receiver of the human body communication system will be described. The receiver includes an analog processing block 23, reception block 222 in the physical-layer modem 22 and the MAC reception processor 212.

Digital reception signals received through the signal electrode 24 pass through the transmission/reception switch 230, a noise filter 231, an amplifier 232, a clock recovery and data retiming part (CDR), and the output of the CDR is transmitted to the reception block 222 in the physical-layer modem 22. The noise filter 231 eliminates added noise of the digital reception signal; the amplifier 232 amplifies the digital reception signal into a desired magnitude signal; and the clock recovery and data retiming part (CDR) compensate frequency offset and time synchronization between the digital reception signals and clock of the receiver.

First, in the reception block 222, the reception signals are transmitted into a frame synchronization unit 2228, and the frame of the reception signal is synchronized in the frame synchronization unit 2228 based on the preamble of the reception signals.

After the frame synchronization is acquired in the frame synchronization unit 2228, a common control signal generating unit 2229 generates common control signals, e.g., a frame boundary signal, a header section signal, a data section signal, a transmission section signal, a reception section signal, which are needed in the transmission block 221 and the reception block 222. A demultiplexer 2220 separates a header section and a data section from the reception signals based on the common control signals generated in the common control signal generating unit 2229 and outputs them.

The header section outputted from the demultiplexer 2220 is transmitted into a header processor 2223 through a despreader 2221 and a HCS verifier 2222. The header processor 2223 extracts control information of the reception signals from the header section and transmits the control information to the MAC reception processor 212.

On the other hand, the data section outputted from the demultiplexer 2220 is transmitted into a frequency selective despreader 2224. The frequency selective despreader 2224 calculates correlation values of the data based on the frequency selective spread codes used in the transmitter, i.e., 16 spread codes used in the transmission block 221 among 64 spread codes, outputs 4-bit data having the largest value among the correlation values. The outputted 4-bit data is converted into a serial data in a parallel-to-serial (P/S) converter 2225 and transmitted into a descrambler 2226.

The descrambler 2226 performs descrambling of the inputted serial data by using the orthogonal code generated based on the predetermined initial value between the two terminals. The descrambled data is processed in a data processor 2227 and transmitted into the MAC reception processor 212.

Like the transmission block 221, the reception block 222 in the physical-layer modem 22 includes the demultiplexer 2220, a header reception processing unit 2202 and a data reception processing unit 2203. Herein, the demultiplexer 2220 performs demultiplexing of the digital signal transmitted through a human body channel, into a preamble, a header and data. The header reception processing unit 2202 recovers by despreading the header, and includes the despreader 2221, the HCS verifier 2222 and the header processor 2223. The data reception processing unit 2203 performs despreading of the data based on spread codes having dominant frequency characteristics among user's desired frequency band, i.e., frequency selective spread codes, includes the frequency selective despreader 2224, the P/S converter 2225, the descrambler 2226 and the data processor 2227.

As the above description, the present invention uses frequency selective baseband and efficiently integrates the data serial-to-parallel conversion in order to reduce bandwidth of transmission data and the frequency selective spreading method in order to get frequency selection and procession gain.

FIGS. 3 to 6 are sub-groups of 64-bit Walsh code in accordance with the present invention.

In the present invention, 64 Walsh Codes are used as spread code, and 64 Walsh Codes are divided into 4 sub-groups as shown in FIGS. 3 to 6. Each sub-group has 16 Walsh Codes. That is, sub-group 0 has $W_0$ to $W_{15}$; sub-group 1 has $W_{16}$ to $W_{31}$; sub-group 2 has $W_{32}$ to $W_{47}$; and sub-group 3 has $W_{48}$ to $W_{63}$.

When the frequency band is divided into 64 bands, 64 Walsh Codes having $W_0$ to $W_{63}$ are mapped to the frequency band including the dominant frequency (fd) of the corresponding Walsh Code in sequence. For example, when spread frequency band occupied by the total Walsh Codes is 16 MHz, a frequency band mapped onto one Walsh Code includes the dominant frequency (fd) of the corresponding Walsh Code and has bandwidth of 16 MHz/64 equal to 250 KHz. Therefore, fd of $W_0$ is 0 Hz; fd of $W_1$ is 250 KHz; fd of $W_{48}$ is 12 MHz; and fd of $W_{63}$ is 15.75 MHz.

In the present invention, when the sub-group 3 having $W_{48}$ to $W_{63}$, denoted by the reference numeral 14 of FIG. 1, is selected, and Walsh Codes having the dominant frequency (fd) from 12 MHz to 15.75 MHz are used among total 16 MHz.

Figures 6, 7:
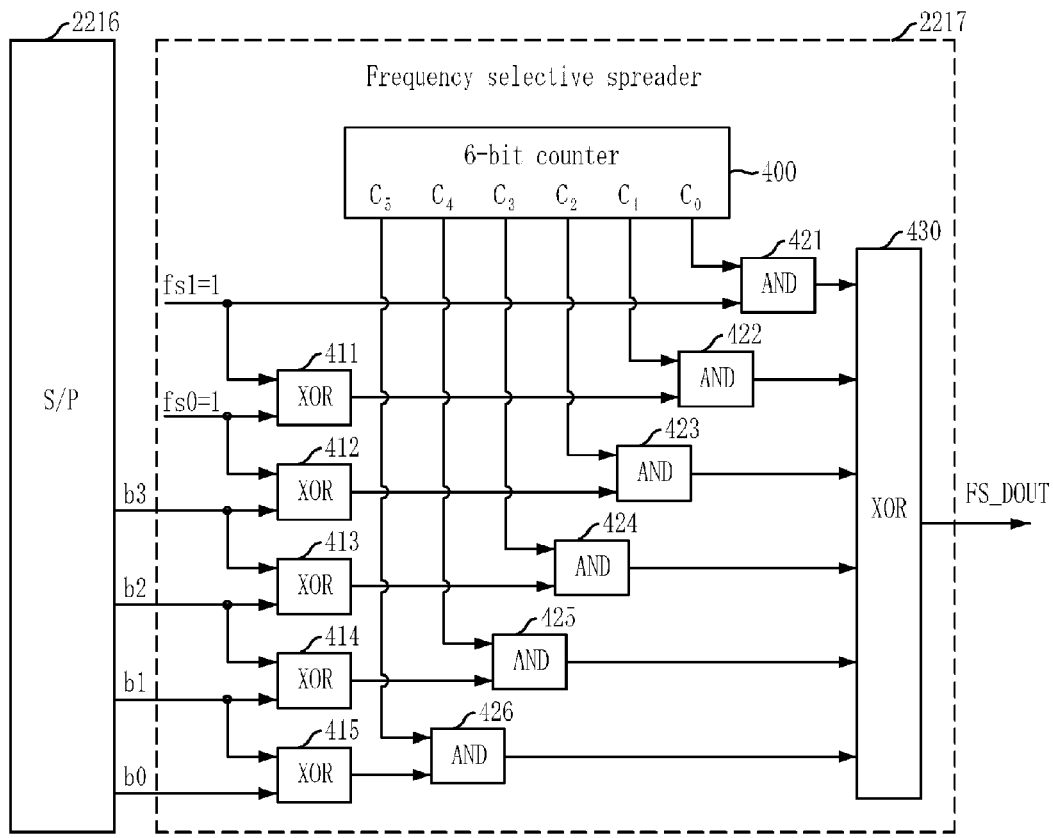

FIG. 7 is a detailed block diagram illustrating a frequency selective spreader of FIG. 2 in accordance with an embodiment of the present invention.

When $2^N$ number of Walsh Codes are used as the spread codes and $2^M$ number of Walsh Codes are selected, where M is smaller than N, the frequency selective spreader 2217 allocates (N-M) number of input bits as the most significant bits among the total N bits, and a desired frequency band among the total frequency bands can be selected based on the (N-M) input bits.

The frequency selective spreader 2217 includes N-bit counter, i.e., 6-bit counter 400, (N-M)-bit frequency selection control bits, i.e., fs1 and fs0, M-bit data input bits, i.e., 4 bits, (N-1) XOR logic circuits 411 to 415 for gray indexing, N AND logic circuits 421 to 426 for performing AND operation by receiving N outputs of the N-bit counter, and the MSB of the frequency selection control bits and (N-1) outputs of the (N-1) XOR logic circuits, respectively, a XOR logic circuit 430 for performing XOR operation by receiving N outputs of the N AND logic circuits. Hereinafter, the frequency selective spreader 2217 will be described in detail.

In this embodiment, 64 Walsh Codes are used as spread codes, and 16 Walsh Codes of the sub-group 3 having $W_{48}$ to $W_{63}$ are selected, the frequency selective spreader 2217 includes a 6-bit counter 400, and receives 2-bit frequency selection control bits, i.e., fs1, fs0, lower 4-bit data input bits, i.e., b3, b2, b1, b0, and 1-bit output, i.e., FS_DOUT.

Also, the frequency selective spreader 2217 includes 5 XOR logic circuits 411 to 415 for gray indexing, 6 AND logic circuits 421 to 426 for performing AND operation by receiving outputs $C_5$ to $C_0$ of the 6-bit counter 400, and fs1 and 5 outputs of the XOR logic circuits 411 to 415, respectively, and XOR logic circuit 430 for performing XOR operation by receiving the 6 outputs of the 6 AND logic circuits.

If 16 Walsh Codes of the sub-group 3 having $W_{48}$ to $W_{63}$ shown in FIG. 6, are selected, 2-bit frequency selection control bit (fs1 and fs0) of the frequency selective spreader 2217 are fixed as "11". The final output, i.e., FS_DOUT, of the frequency selective spreader 2217 is expressed as the following Eq. 1.

$$FD\_DOUT = (fs1 \text{ and } C0) \text{ xor } [(fs1 \text{ xor } fs0) \text{ and } C1]$$
$$\text{xor } [(fs0 \text{ xor } b3) \text{ and } C2] \text{ xor } [(b3 \text{ xor } b2) \text{ and }$$
$$C3] \text{ xor}[(b2 \text{ xor } b1) \text{ and } C4] \text{ xor } [(b1 \text{ xor } b0) \text{ and }$$
$$C5] \qquad \text{Eq. 1}$$

In the above description, the human body communication is described as an embodiment of the present invention, however, the present invention be applied to the digital communication system.

The above described method according to the present invention can be embodied as a program and be stored on a computer readable recording medium. The computer readable recording medium is any data storage device that can store data which can be read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2006-0124028, filed in the Korean Intellectual Property Office on Dec. 7, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A transmitter of a human body communication system, comprising:
   a data input means for inputting data
   a data transmission processing means for spreading the inputted data using frequency selective spread codes, the data transmission processing means including a serial-to-parallel converting means for converting serial data outputted from the data input means into parallel data, the data transmission processing means further including a frequency selective spreading means for spreading the parallel data based on the frequency selective spread codes to select a dominant frequency in a selected frequency band from among a plurality of frequency bands;
   a preamble transmission processing means for generating a preamble for frame synchronization and spreading the preamble; and
   a header transmission processing means for generating a header including information of the data and spreading the header.

2. The transmitter of claim 1, wherein the preamble transmission processing means spreads the preamble using the frequency selective spread code.

3. The transmitter of claim 1, wherein the header transmission processing means spreads the header using the frequency selective spread code.

4. The transmitter of claim 1, wherein the transmitter further includes:
   a multiplexing means for multiplexing the spreaded preamble from the preamble transmission processing means, the spreaded header from the header transmission processing means, and the frequency selective spreaded data from the data transmission processing means.

5. A transmitter of a human body communication system, comprising:
   a data input means for inputting data; and
   a data transmission processing means for spreading the inputted data using frequency selective spread codes, the data transmission processing means including a serial-to-parallel converting means for converting serial data outputted from the data input means into parallel data, the data transmission processing means further including a frequency selective spreading means for spreading the parallel data based on the frequency selective spread codes to select a dominant frequency in a selected frequency band from among a plurality of frequency bands; and
   a preamble/header transmission processing means, wherein the preamble/header transmission processing means includes:
   a preamble generating means for generating a preamble for frame synchronization;
   a header generating means for receiving data information from a MAC processor and generating a header having a predetermined header format; and
   a spreading means for spreading the preamble and the header by using a predetermined spread code among the frequency selective spread codes.

6. The transmitter of claim 5, wherein the frequency selective spreading means allocates (N-M) most significant bits of N bits of the parallel data as frequency selection control bits to control the frequency selection, when $2^N$ number of Walsh Codes are used as the spread codes and $2^M$ number of Walsh Codes are selected as the frequency selective spread codes, where M is smaller than N.

7. The transmitter of claim 5, wherein the frequency selective spreading means includes:
   a N-bit counter;
   (N-1) first XOR operation means for gray indexing (N-M)-bit frequency selection control bits and M-bit data input bits, respectively;
   N AND operation means for performing an AND operation between N outputs of an N-bit counter, and MSB of the frequency selection control bits and (N-1) outputs of (N-1) first XOR operation means, respectively; and
   a second XOR operation means for performing an XOR operation of N outputs of the N AND operation means.

8. A receiver of a digital communication system, comprising:
   a demultiplexing means for demultiplexing a digital signal transmitted from a transmitter into a preamble, a header and data;
   a data reception processing means for despreading the data based on frequency selective spread codes, which are used in a transmitter,
   wherein the frequency selective spread codes are spread codes corresponding to a dominant frequency in a selected frequency band that is selected by allocating (N-M) most significant bits of N bits of the data as frequency selection control bits and controlling the frequency selection based on the (N-M) number of the data, when $2^N$ number of Walsh Codes are used as the spread code and $2^M$ number of Walsh Codes are selected as the frequency selective spread code, where M is smaller than N.

9. The receiver of claim 8, wherein the receiver further includes:
   a header reception processing means for despreading the header; and
   a preamble reception processing means for despreading the preamble.

10. The receiver of claim 8, wherein the digital communication system is a human body communication system using the human body as a communication channel.

11. The receiver of claim 8, wherein the digital communication system is a human body communication system using the human body as a communication channel.

12. A method for transmitting signals in a digital communication system, comprising:
   inputting data;
   spreading the inputted data using frequency selective spread codes, wherein the frequency selective spread codes are spread codes corresponding to a dominant frequency in a selected frequency band;
   allocating (N-M) most significant bits of N bits of the inputted data as frequency selection control bits for frequency selection; and
   performing frequency selection based on the (N-M) most significant bits of the N bits of the inputted data, when $2^N$ number of Walsh Codes are used as the spread code and $2^M$ number of the Walsh Codes are selected as the frequency selective spread code, wherein M is smaller than N.

13. A method for receiving signals in a digital communication system, comprising:

demultiplexing a digital signal transmitted from a transmitter into a preamble, a header and data;

despreading the data based on frequency selective spread codes, which are used in a transmitter, wherein the frequency selective spread code is a spread code corresponding to a dominant frequency in a selected frequency band that is selected by allocating (N-M) most significant bits of N bits of the data as frequency selection control bits and controlling the frequency selection based on the (N-M) number of the data, when $2^N$ number of Walsh Codes are used as the spread code and $2^M$ number of Walsh Codes are selected as the frequency selective spread code, where M is smaller than N.

* * * * *